US007660515B2

(12) United States Patent
Sato

(10) Patent No.: US 7,660,515 B2
(45) Date of Patent: *Feb. 9, 2010

(54) BROADCAST PROGRAM RECORDING APPARATUS USING ELECTRONIC PROGRAM GUIDE

(75) Inventor: Masahiko Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 339 days.

This patent is subject to a terminal disclaimer.

(21) Appl. No.: 11/370,481

(22) Filed: Mar. 7, 2006

(65) Prior Publication Data

US 2006/0153528 A1 Jul. 13, 2006

Related U.S. Application Data

(63) Continuation of application No. 09/558,899, filed on Apr. 26, 2000, now Pat. No. 7,046,913.

(30) Foreign Application Priority Data

Apr. 28, 1999 (JP) .................. 11-121808

(51) Int. Cl.
H04N 5/91 (2006.01)
(52) U.S. Cl. ........................................ 386/83
(58) Field of Classification Search ................... 386/83, 386/95; 725/38, 39, 44, 50
See application file for complete search history.

(56) References Cited

U.S. PATENT DOCUMENTS

| 5,390,027 | A | 2/1995 | Henmi et al. |
| 5,585,865 | A | 12/1996 | Amano et al. |
| 5,619,274 | A | 4/1997 | Roop et al. |
| 5,726,702 | A | 3/1998 | Hamaguchi et al. |
| 5,808,608 | A | 9/1998 | Young et al. |
| 6,005,562 | A | 12/1999 | Shiga et al. |
| 6,192,187 | B1 | 2/2001 | Kinghorn |
| 6,407,776 | B1 * | 6/2002 | Sekimoto et al. ............ 348/553 |
| 6,608,963 | B1 | 8/2003 | Yuen et al. |
| 6,643,620 | B1 | 11/2003 | Contolini et al. |
| 2002/0006267 | A1 * | 1/2002 | Yuen et al. .................... 386/83 |

FOREIGN PATENT DOCUMENTS

DE 197 40 079 3/1999

(Continued)

*Primary Examiner*—David E Harvey
(74) *Attorney, Agent, or Firm*—Frommer Lawrence & Haug LLP; William S. Frommer

(57) ABSTRACT

A broadcast program recording apparatus is provided in which ease of operation is improved for selecting a broadcast program to be entered by making it possible to enter a broadcast program to be recorded, by using EPG data, even when a broadcast program which is being currently broadcast is being recorded. The broadcast program recording apparatus includes a tuner section for receiving a broadcast program containing broadcast program information, an EPG decoder for decoding the broadcast program information received by the tuner section, a controller having recording management information which is created by extracting a broadcast program to be recorded from the decoded EPG data, and a recording section for recording the broadcast program on the basis of the recording management information. The controller compares the current time with a broadcast program start time contained in the EPG data, and enters a new broadcast program into the recording management information when the current broadcast program is to be changed or immediately after it is changed.

12 Claims, 5 Drawing Sheets

FOREIGN PATENT DOCUMENTS

| | | |
|---|---|---|
| EP | 0 920 200 | 6/1999 |
| EP | 0 975 163 | 1/2000 |
| JP | 6 52654 | 2/1994 |
| JP | 7 193762 | 7/1995 |
| JP | 7 201157 | 8/1995 |
| JP | 7 240904 | 9/1995 |
| JP | 8 317331 | 11/1996 |
| JP | 9 237484 | 9/1997 |
| JP | 2000 78505 | 3/2000 |
| WO | WO 95 01056 | 1/1995 |
| WO | WO 98 10589 | 3/1998 |

* cited by examiner

BROADCAST PROGRAM RECORDING APPARATUS USING ELECTRONIC PROGRAM GUIDE

This is a continuation of application Ser. No. 09/558,899, filed Apr. 26, 2000 now U.S. Pat. No. 7,046,913, which claims priority to Japanese patent application 11-121808, filed Apr. 28, 1999, the entirety of which is incorporated herein by reference.

BACKGROUND OF THE INVENTION

1. Field of the Invention

The present invention relates to a broadcast program recording apparatus using an EPG (Electronic Program Guide). More particularly, the present invention relates to a broadcast program recording apparatus which is capable of detecting a time at which a broadcast program which is being recorded is changed in order to enter a new broadcast program.

2. Description of the Related Art

Conventionally, in media which provide a large number of programs, such as digital satellite broadcasts, FM multiplex broadcasts, or the Internet, an EPG has been introduced to improve the convenience of selecting a broadcast program. For example, in a digital satellite broadcast, broadcast program information which is transmitted, such as a channel number, a program name, a schedule, etc., is decoded by an EPG decoder within a receiver, and the EPG data is displayed on a television monitor (on-screen display). A selection can be made from these on-screen displayed broadcast programs, and the selected broadcast program is used to make an entry in recording management information so as to perform recording management. A new broadcast program to be entered into this recording management information can be entered and stored by giving instructions using a remote control unit, etc.

However, as described in the conventional art, there is a problem in that entering a new broadcast program into recording management information can be performed only when recording starts. For example, even if attempts are made to enter a new broadcast program while recording is being performed, the new broadcast program cannot be entered into the recording management information and retrieval at later time cannot be performed.

SUMMARY OF THE INVENTION

Accordingly, an object of the present invention is to provide a broadcast program recording apparatus in which entering a new broadcast program into recording management information can be performed even if a broadcast program is being recorded.

To achieve the above-mentioned object, according to the present invention, there is provided a broadcast program recording apparatus using an EPG, comprising: a tuner section for receiving a broadcast program containing broadcast program information; an EPG decoder section for decoding the broadcast program information received by the tuner section; a controller having recording management information which is created by extracting a broadcast program to be recorded from the decoded EPG data; and a recording section for recording the broadcast program on the basis of the recording management information, wherein the controller compares the current time with a broadcast program start time contained in the EPG data, and enters a new broadcast program into the recording management information when a broadcast program which is being recorded is to be changed or immediately after it is changed.

The EPG decoder can accept broadcast program information directly from the outside, and the current time is produced from time information input from the outside.

In the manner as described above, as a result of being able to enter a new broadcast program when a broadcast program is to be changed, it is possible to enter the new broadcast program without a user having to perform a special operation, thereby improving the ease of operation.

The above and further objects, aspects and novel features of the invention will become more apparent from the following detailed description when read in conjunction with the accompanying drawings.

DESCRIPTION OF THE PREFERRED EMBODIMENTS

Various embodiments of a broadcast program recording apparatus using an EPG according to the present invention are described below with reference to the accompanying drawings.

Figure 1:
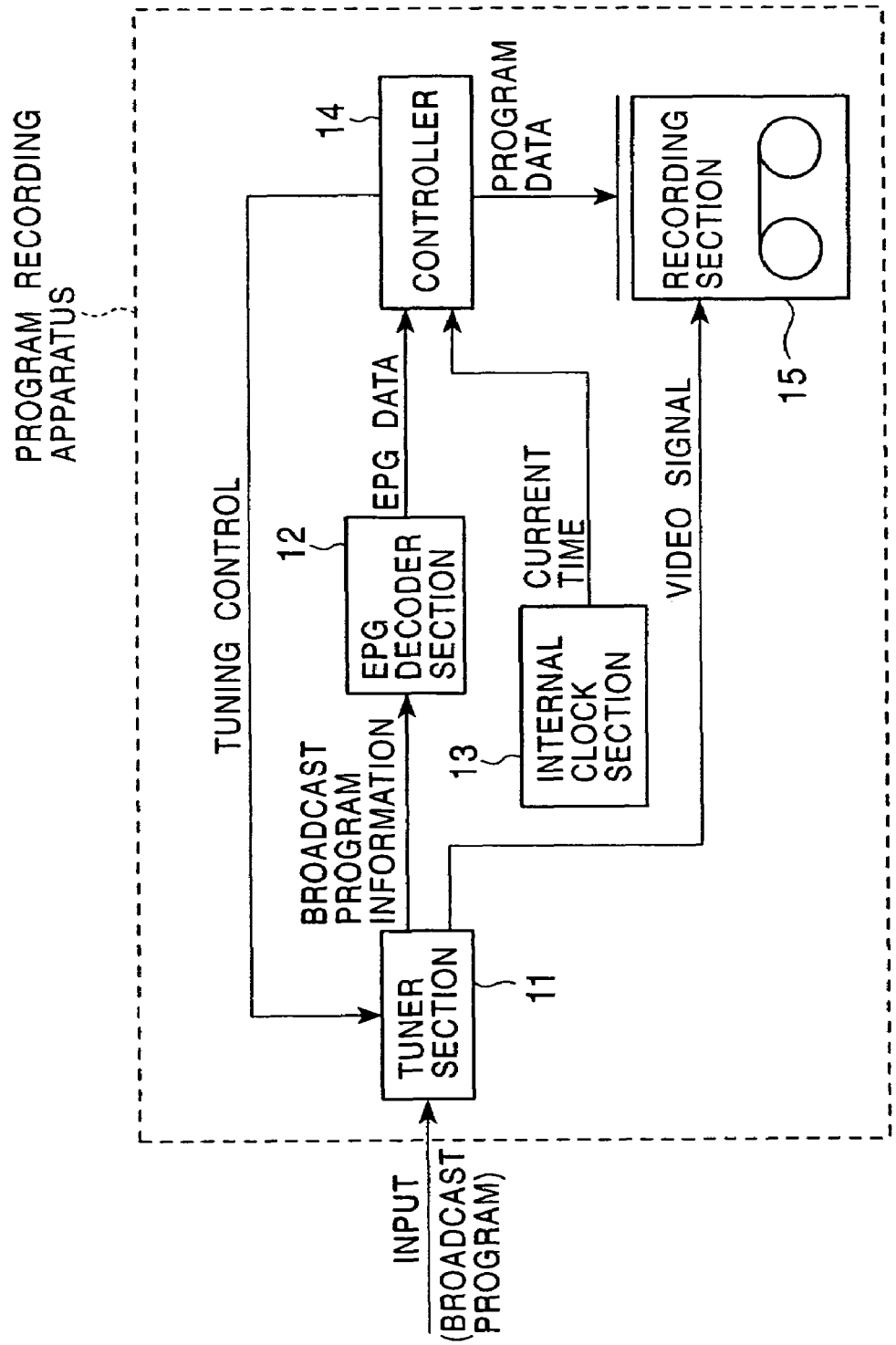
FIG. 1 is a block diagram of a broadcast program recording apparatus using an EPG according to a first embodiment of the present invention.

As shown in FIG. 1, a broadcast program recording apparatus using an EPG according to a first embodiment comprises a tuner section 11 for receiving a broadcast program containing broadcast program information, an EPG decoder section 12 for decoding broadcast program information in the broadcast program received by the tuner section 11, an internal clock section 13 for outputting the current time, a controller 14 having recording management information-produced by extracting a broadcast program to be recorded from the decoded EPG data, and a recording section 15 for performing recording, such as video recording of a broadcast program, on the basis of the recording management information.

In such a construction, the EPG decoder section 12 decodes the broadcast program information in order to create EPG data. This EPG data broadly comprises the current time, a receiving channel, a broadcasting station name, a broadcasting time, and a program title of the broadcast program which is being broadcast at this broadcasting time. Also, this EPG data may be text data which has been edited so as to have a correlation between the broadcasting time and the program title.

Figure 2:
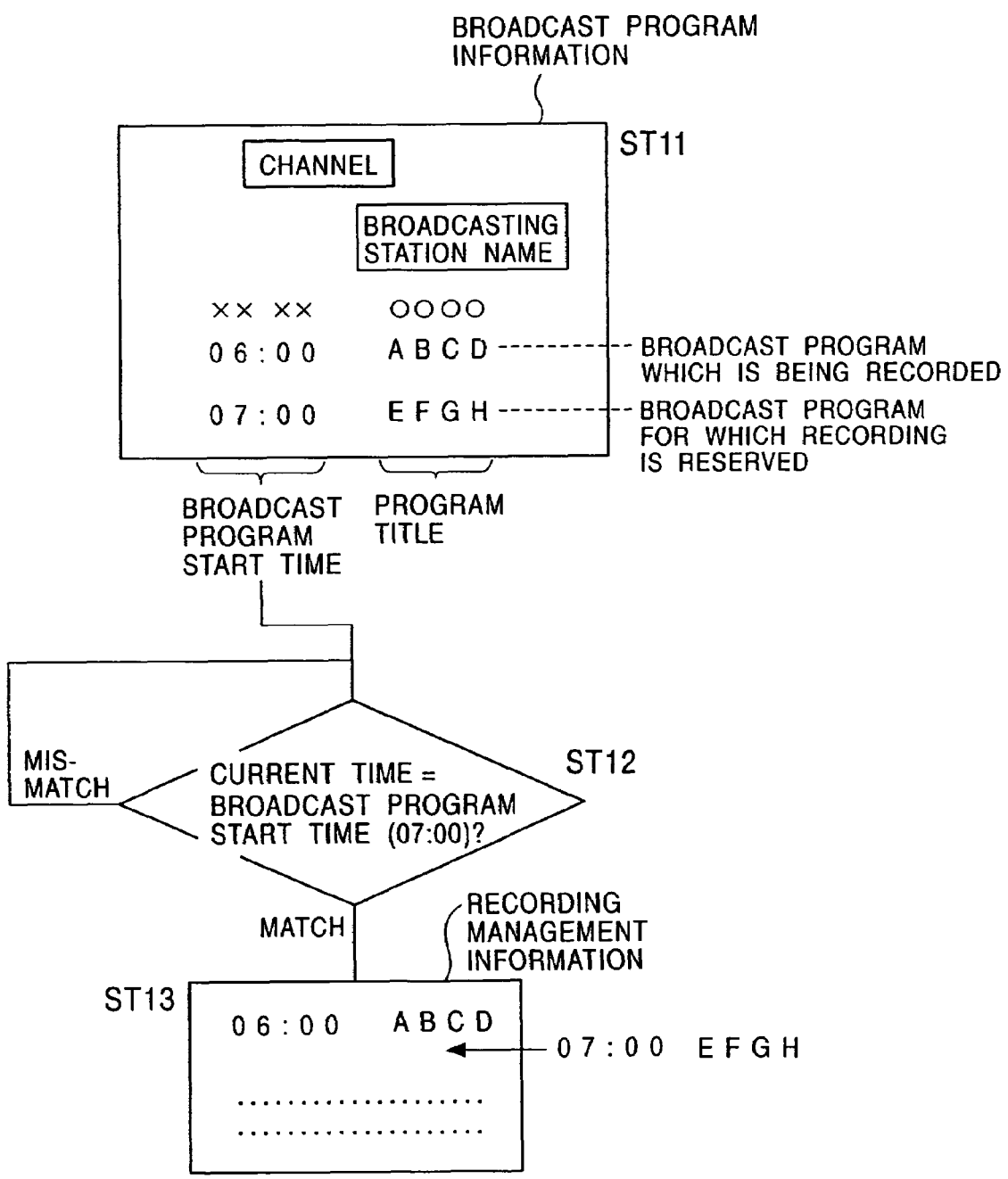
FIG. 2 is a flowchart showing a part of the operation of a controller which is a constituent of the recording apparatus.

As shown in FIG. 2, initially, the controller 14 causes EPG data to be displayed on screen when a recording operation ("06:00 ABCD" in the embodiment) is being performed. Then, the controller 14 specifies a desired broadcasting time and a desired program title ("07:00 EFGH" in the embodiment) (step ST11).

In this state, a broadcast program start time ("07:00" in the embodiment) to be compared is extracted from the broadcast program information of the EPG and is compared with the current time (step ST12). It is assumed that the comparison produces a match when the broadcast program start time coincides with the current time or when it is immediately after the broadcasting time. If they coincide with each other, the broadcast program is entered as a new broadcast program into the recording management information ("07:00 EFGH" in the embodiment) (step ST13).

The program entered into this recording management information is automatically recorded. As a result of the above, when a desired broadcast program is extracted automatically from among a large number of broadcast programs and is reserved, the reserved broadcast program is entered automatically into the recording management information, and can be recorded automatically. In this manner, it is not necessary to perform a new recording operation which is performed after a predetermined broadcast program is entered. Therefore, ease of operation for selecting a broadcast program can be improved.

Figure 3:
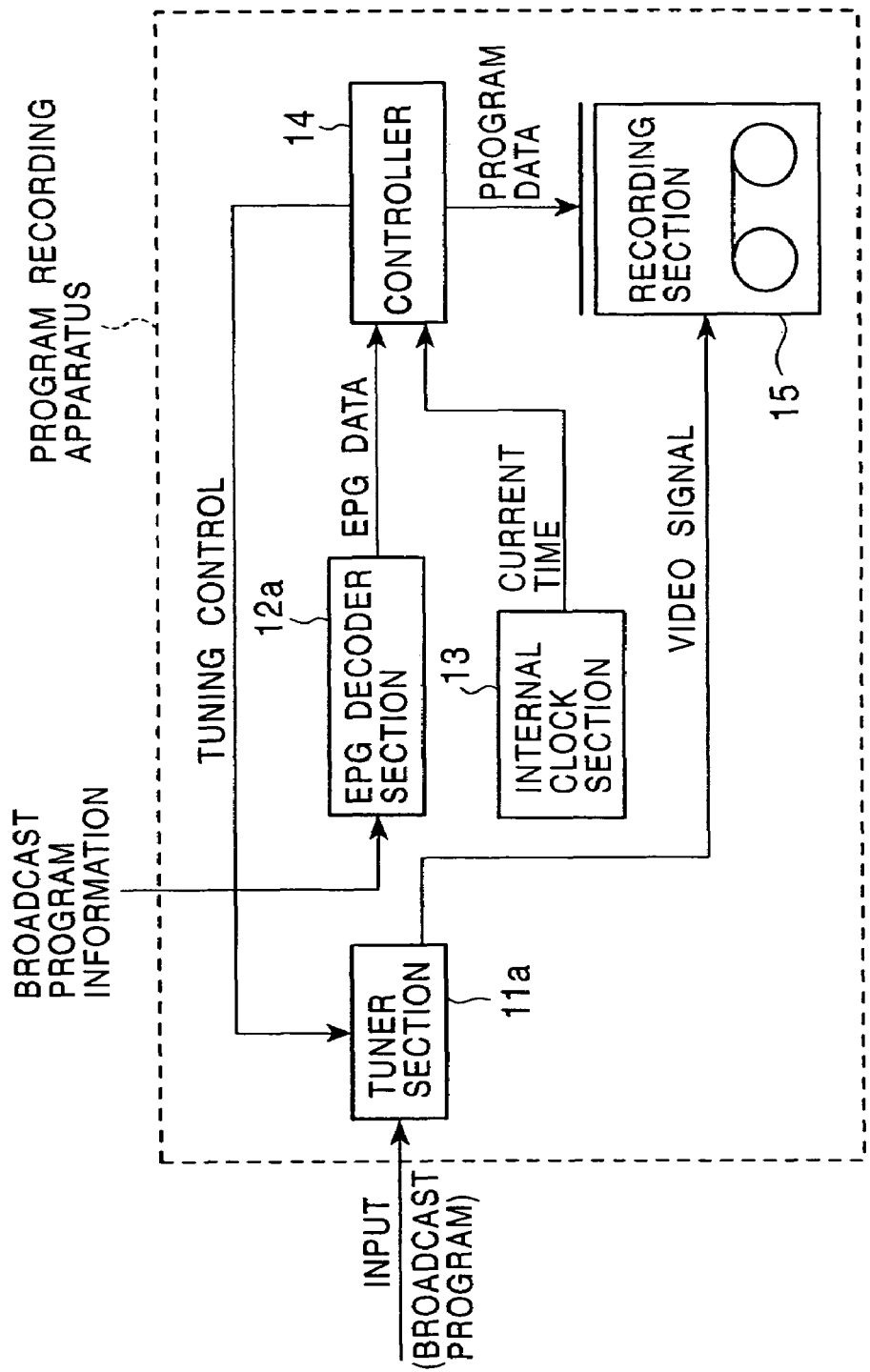
FIG. 3 is a block diagram of a broadcast program recording apparatus using an EPG according to a second embodiment of the present invention.

A broadcast program recording apparatus using an EPG according to a second embodiment aims to receive broadcast program information from the outside, for example, from the Internet, as shown in FIG. 3. The broadcast program recording apparatus of this embodiment comprises a tuner section 11a for receiving a broadcast program, an EPG decoder section 12a for directly receiving and decoding the broadcast program information by using the Internet, etc., an internal clock section 13 for outputting the current time, a controller 14 having recording management information which is created by extracting a broadcast program to be recorded from the decoded EPG data, and a recording section 15 for performing a recording, such as video recording of a broadcast program, on the basis of the recording management information.

In such a construction, the EPG decoder section 12a receives broadcast program information directly via the Internet, etc., and decodes it to produce EPG data. Then, in a manner similar to that described in the first embodiment, the broadcast start time of the EPG data is compared with the current time. If the broadcast program start time coincides with the current time or is immediately after it, the comparison produces a match, and a new broadcast program which is reserved is entered into the recording management information.

Figure 4:
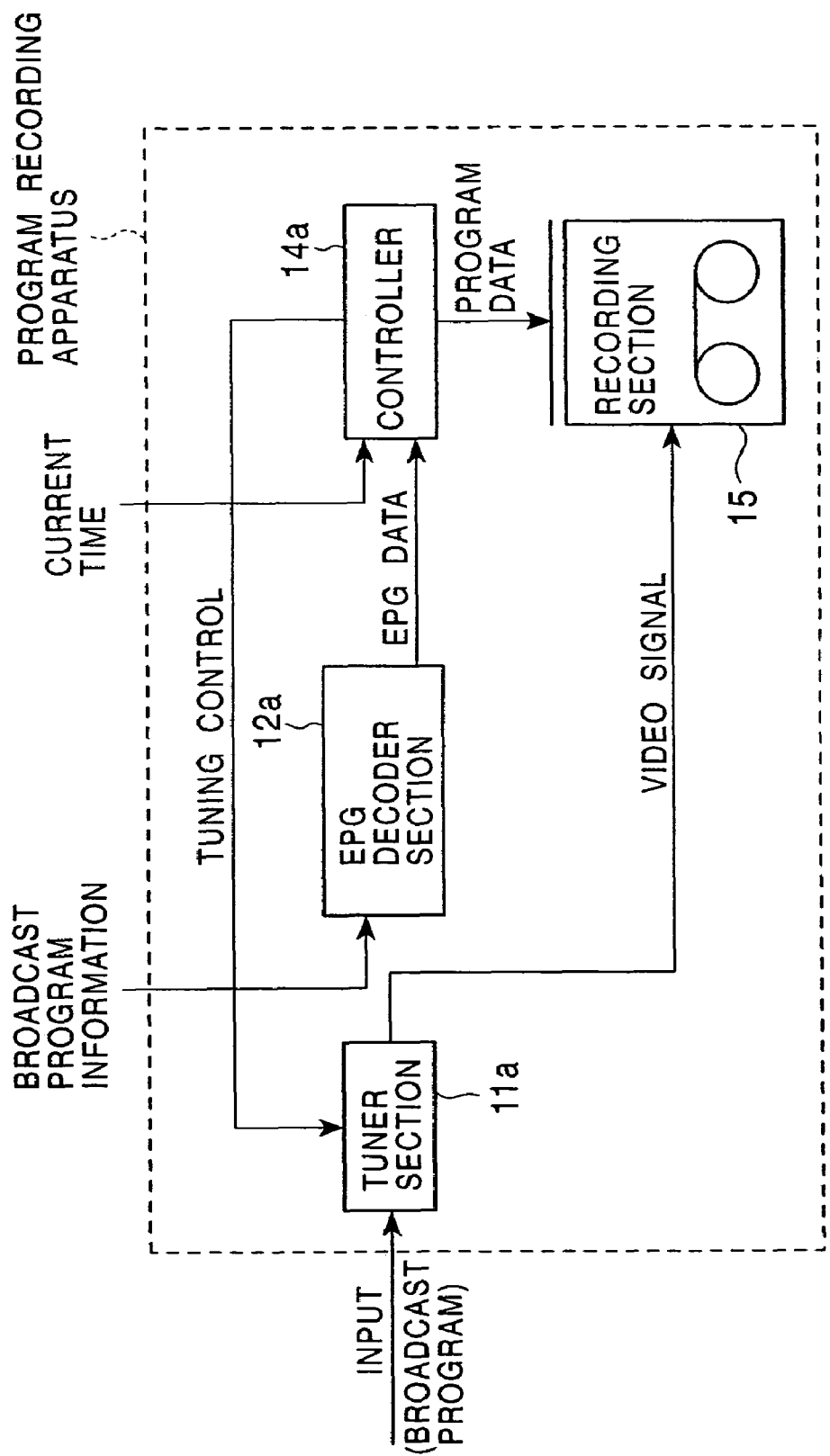
FIG. 4 is a block diagram of a broadcast program recording apparatus using an EPG according to a third embodiment of the present invention.

A broadcast program recording apparatus using an EPG according to a third embodiment, as shown in FIG. 4, aims to receive EPG data from the Internet, etc., and also to receive current time information from the outside. The broadcast program recording apparatus of this embodiment comprises a tuner section 11a for receiving a broadcast program, an EPG decoder section 12a for receiving and decoding broadcast program information from the Internet, etc., a controller 14a having recording management information which is produced by extracting a broadcast program to be recorded from the decoded EPG data, and a recording section 15 for recording a broadcast program on the basis of the recording management information.

In such a construction, the EPG decoder section 12a decodes the broadcast program information obtained from the Internet, etc., in order to produce EPG data. Then, in a manner similar to that described in the first embodiment, the broadcast program start time of the EPG data is compared with the internal current time obtained from the outside. If the broadcast program start time coincides with the internal current time or is immediately after it, it is assumed that the comparison produces a match, and a new broadcast program which is reserved is entered into the recording management information.

Figure 5:
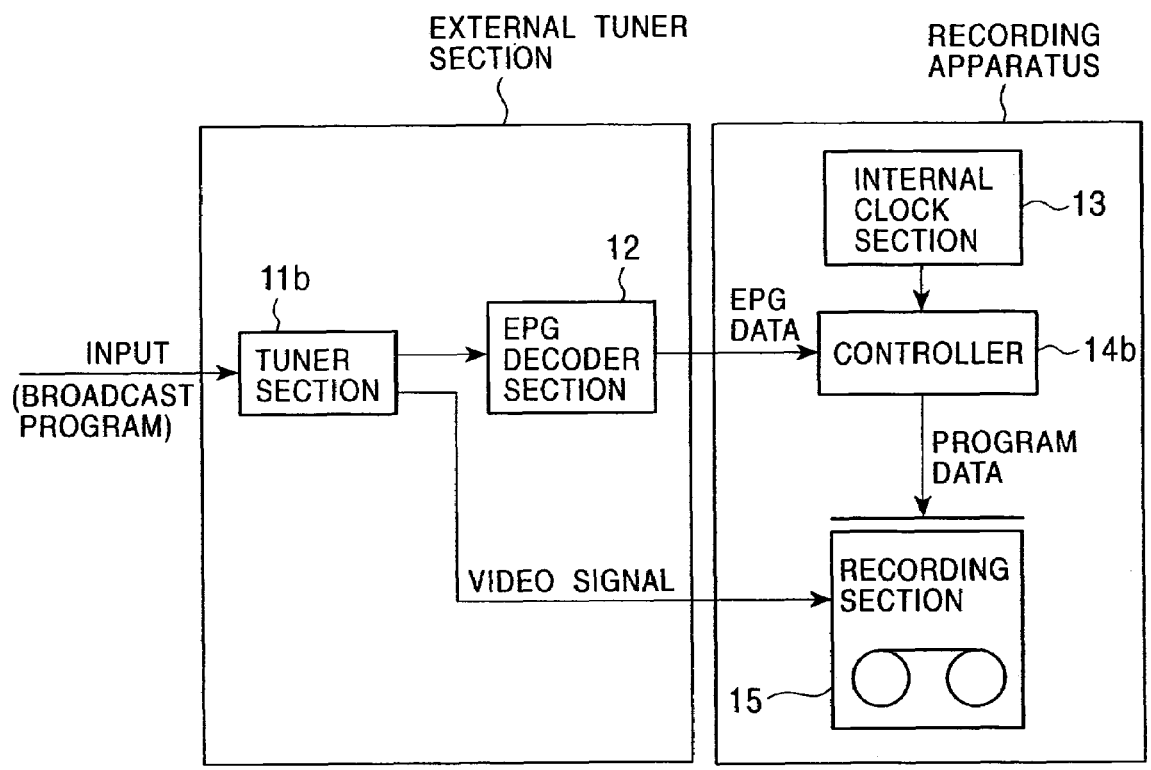
FIG. 5 is a block diagram of a broadcast program recording apparatus using an EPG according to a fourth embodiment of the present invention.

A broadcast program recording apparatus using an EPG according to a fourth embodiment, as shown in FIG. 5, is constructed in such a way that an external tuner for receiving a broadcast program containing broadcast program information and a recording apparatus for performing a recording are separated from each other. That is, the external tuner section comprises a tuner section 11b for receiving a broadcast program containing broadcast program information, and an EPG decoder section 12 for decoding the broadcast program information received by the tuner section 11b. The recording apparatus comprises a controller 14b having recording management information which is produced by extracting a broadcast program to be recorded from the EPG data produced by the EPG decoder section 12, an internal clock section 13 for outputting the internal current time, and a recording apparatus 15 for performing a recording, such as video recording of a broadcast program, on the basis of the recording management information.

In such a construction, in a manner similar to that described in the first embodiment, the broadcast program start time of the EPG data is compared with the internal current time. If the broadcast program start time coincides with the internal current time or is immediately after it, it is assumed that the comparison produces a match, and a new broadcast program which is reserved is entered into the recording management information.

As has thus been described, in the broadcast program recording apparatus using an EPG according to the present invention, by comparing a broadcast program start time with the current time, a new broadcast program can be entered into recording management information when the broadcast program is to be changed or immediately after it is changed. Thus, there is an advantage in that a new broadcast program can be entered even if recording is being performed, thereby improving the ease of a recording operation by a user.

Many different embodiments of the present invention may be constructed without departing from the spirit and scope of the present invention. It should be understood that the present invention is not limited to the specific embodiments described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A program recording apparatus using EPG data, comprising:

a receiver for receiving a current program containing program information;

an EPG decoder section for decoding the received program information to output the EPG data, which includes a current time and a program start time;

a controller configured to extract recording management information from the decoded EPG data, wherein said controller compares the current time with the program start time, outputs a match signal in response to substantial coincidence of time between the current time and the program start time, and enters a new desired program into said recording management information when the match signal is output so that the new desired program can be entered into the recording management information even when said controller is already managing recording of the current program said controller reserving and automatically entering the new desired broadcast program into the recording management information using said decoded EPG data; and a recording section for controlling the current program using the recording management information.

2. A program recording apparatus according to claim 1, wherein said EPG decoder section can directly receive program information from the Internet.

3. A program recording apparatus according to claim 1, further comprising a timing source operating to supply the current time to the controller.

4. A program recording apparatus according to claim 1, wherein said EPG data includes a receiving channel.

5. A program recording apparatus according to claim 1, wherein said EPG data includes a broadcasting station name.

6. A program recording apparatus according to claim 1, wherein said EPG data includes a title of the program.

7. A program recording apparatus according to claim 6, wherein said EPG data includes said EPG data includes text data edited to include a correlation between the program start time and the title of the current program.

8. A program recording method using EPG data, comprising:

receiving a current program including program information;

decoding the received program information to output EPG data, which includes a current time and a program start time;

extracting recording management information from the decoded EPG data, comparing the current time with the program start time;

outputting a match signal in response to substantial coincidence of time between the current time and the program start time;

entering a new desired program into the recording management information when the match signal is output so that the new desired program is reserved and is automatically entered into the recording management information even when recording of the current program is in progress, wherein said decoded EPG data is used to reserve and automatically enter the new desired program into the recording management information; and recording the current program using the recording management information.

9. A program recording method according to claim 8, wherein receiving a current program including program information comprises receiving the program information from the Internet.

10. A program recording method according to claim 8, further comprising receiving the current time from a timing source.

11. A computer program, stored in a tangible storage medium, for use in program recording, the computer program comprising executable instructions that cause a computer to:

receive a current program including program information;

decode the received program information to output EPG data, which includes a current time and a program start time;

extract recording management information from the decoded EPG data, compare the current time with the program start time;

output a match signal in response to substantial coincidence of time between the current time and the program start time;

enter a new desired program into the recording management information when the match signal is output so that the new desired program is reserved and is automatically entered into the recording management information even when recording of the current program is in progress, wherein said decoded EPG data is used to reserve and automatically enter the new desired program into the recording management information; and record the current program using the recording management information.

12. A program recording system using EPG data, comprising:

means for receiving a current program including program information;

means for decoding the received program information to output EPG data, which includes a current time and a program start time;

means for extracting recording management information from the decoded EPG data, means for comparing the current time with the program start time;

means for outputting a match signal in response to substantial coincidence of time between the current time and the program time;

means for entering a new desired program into the recording management information when the match signal is output so that new desired program is reserved and is automatically entered into the recording management information even when recording of the current program is in progress, wherein said decoded EPG data is used to reserve and automatically enter the new desired program into the recording management information; and means for recording the current program using the recording management information.

* * * * *